(12) United States Patent
Lien

(10) Patent No.: US 8,393,837 B1
(45) Date of Patent: Mar. 12, 2013

(54) DECK AND RAMP SYSTEM FOR SEMIS/TRACTORS

(76) Inventor: Bradford J. Lien, Longmont, CO (US)

( * ) Notice: Subject to any disclaimer, the term of this patent is extended or adjusted under 35 U.S.C. 154(b) by 0 days.

(21) Appl. No.: 13/288,458

(22) Filed: Nov. 3, 2011

(51) Int. Cl.
*B60P 3/06* (2006.01)
(52) U.S. Cl. .......................................................... 410/3
(58) Field of Classification Search ......... 410/3; 296/61
See application file for complete search history.

(56) References Cited

U.S. PATENT DOCUMENTS

| | | | |
|---|---|---|---|
| D264,199 S | 5/1982 | Wood | |
| 4,932,829 A | 6/1990 | Miller | |
| 5,730,577 A | 3/1998 | Jones | |
| 5,934,863 A | 8/1999 | Beck | |
| 6,634,849 B2 | 10/2003 | Clary | |
| 6,695,565 B1 | 2/2004 | Franchuk | |
| 6,827,543 B2 | 12/2004 | O'Neil | |
| 7,549,692 B2 * | 6/2009 | Washington | 296/61 |
| 2004/0101390 A1 | 5/2004 | O'Neil | |
| 2008/0290627 A1 * | 11/2008 | Gilbert | 280/204 |

* cited by examiner

*Primary Examiner* — Hilary Gutman

(57) ABSTRACT

A deck and ramp system for allowing a motorcycle to be secured behind the cab or sleeper of a semi/tractor featuring a deck platform and two attachable ramps. The deck platform is attached to the frame behind the cab or sleeper such that it is accessible from the passenger side or driver side of the semi. The two ramps attach at an angle with respect to the deck platform. Channels are disposed in the ramps and deck platform and allow a motorcycle to be easily rolled up the ramps and onto the deck platform. One or more securing means are disposed on the deck platform so as to secure the motorcycle.

7 Claims, 8 Drawing Sheets

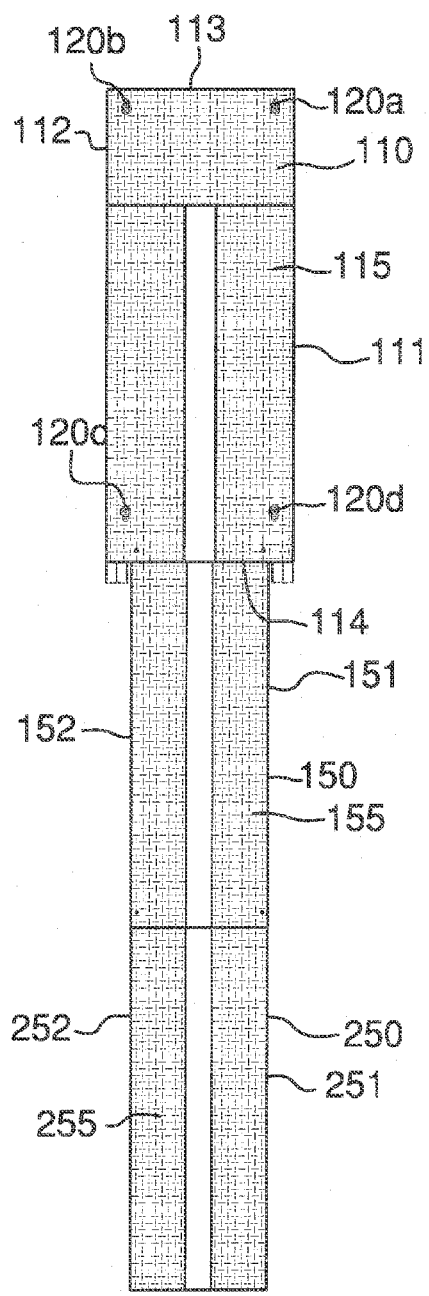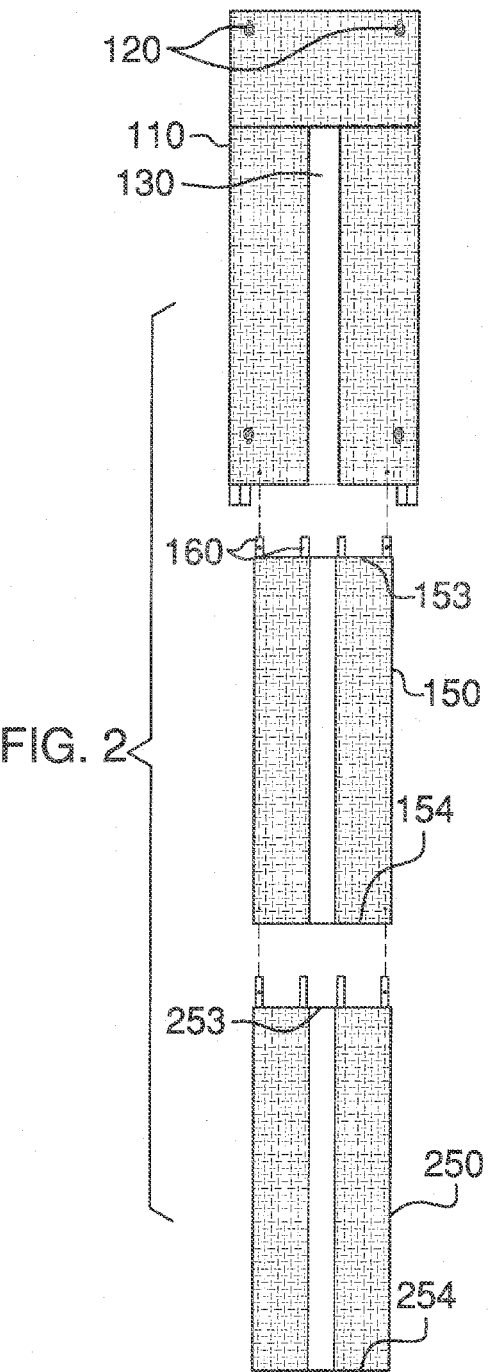

DECK AND RAMP SYSTEM FOR SEMIS/TRACTORS

FIELD OF THE INVENTION

The present invention is directed to a deck and ramp system for semis/tractors enabling a motorcycle to be mounted behind the cab or sleeper.

BACKGROUND OF THE INVENTION

Truck drivers are typically limited to using their truck for personal transportation during their required rest times. Using the truck for personal use can be very costly for drivers (e.g., because of fuel costs, etc.), and it is also energy inefficient. As an example, some drivers have required rest times and are approximately 50-100 miles from home (or are within a reasonable distance from home that would ordinarily enable them to drive home if they were not limited to use of the semi/tractor). These drivers may wish to go home for dinner or to see their loved ones but may be unable to do so because of the cost to drive the semi/tractor or because of government rest regulations (or other reasons associated with the semi/tractor). The present invention features a deck and ramp system enabling a motorcycle (exclusively a motorcycle) to be mounted behind the cab or sleeper of the semi/tractor. The availability of the motorcycle enables the driver to drive home or drive to another desired location (e.g. for personal relaxation, etc.) during his/her rest time, eliminates the stress or cost associated with using the semi/tractor (and saves fuel and emissions), and prevents the driver from being "stuck" with his/her semi/tractor. In addition, the motorcycle enables a driver to quickly drive to find parts if the semi/tractor is inoperable. Importantly, system of the present invention is uniquely designed to be approved by the Department of Transportation (e.g., Federal Motor Carrier Safety Administration) for use on the semi/tractor.

SUMMARY

The present invention features a deck and ramp system for allowing a motorcycle to be mounted behind a cab or sleeper of a semi/tractor. The deck and ramp system comprises a semi/tractor having a cab or sleeper and a frame behind the cab or sleeper (such semis/tractors are well known to one of ordinary skill in the art); a deck platform having a first side, a second side opposite the first side, a third side, a fourth side, and a top surface, wherein a first channel is disposed in the top surface of the deck platform extending from the fourth side to near the third side, the deck platform is mounted to the frame behind the cab or sleeper of the semi/tractor such that the first side and the second side are perpendicular to a length of the semi/tractor; a first securing means disposed on the top surface of the deck platform positioned near an intersection of the first side and the third side, a second securing means disposed on the top surface of the deck platform positioned near an intersection of the second side and the third side, a third securing means disposed on the top surface of the deck platform positioned near an intersection of the second side and the fourth side, and a fourth securing means disposed on the top surface of the deck platform positioned near an intersection of the first side and the fourth side, the securing means are adapted to engage bungees, straps, ropes, or chains so as to secure a motorcycle to the deck platform with wheels of the motorcycle engaged in the first channel; a first ramp having a first side, a second side, a third side, a fourth side, a top surface, and a second channel disposed in the top surface extending from the third side to the fourth side, the third side of the first ramp removably attaches to the fourth side of the deck platform such that the second channel is aligned with the first channel, the first ramp is at an angle with respect to the deck platform; and a second ramp having a first side, a second side, a third side, a fourth side, a top surface, and a third channel disposed in the top surface extending from the third side to the fourth side, the third side of the second ramp attaches to the fourth side of the first ramp such that the third channel is aligned with the second channel, the top surface of the second ramp is aligned with the top surface of the first ramp.

In some embodiments, the securing means comprise D-rings. In some embodiments, the angle is between about 120 to 140 degrees. In some embodiments, the angle is between about 130 to 150 degrees. In some embodiments, the angle is between about 140 to 160 degrees. In some embodiments, a flange extends outwardly from the third side of the first ramp and is adapted to be snugly inserted into a channel disposed in the fourth side of the deck platform, a first hole is disposed in the deck platform extending through to the channel and a second hole is disposed in the flange, wherein when the flange is inserted into the channel the second hole aligns with the first hole, the first hole and the second hole are both adapted to accept a locking pin, the locking pin secures the first ramp to the deck platform. In some embodiments, a flange extends outwardly from the third side of the second ramp and is adapted to be snugly inserted into a channel disposed in the fourth side of the first ramp, a first hole is disposed in the first ramp extending through to the channel and a second hole is disposed in the flange, wherein when the flange is inserted into the channel the second hole aligns with the first hole, the first hole and the second hole are both adapted to accept a locking pin, the locking pin secure the second ramp to the first ramp.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a top view of the system of the present invention.

FIG. 2 is an exploded view of the system of the present invention.

FIG. 7A shows a wheel chock 109 installed on the deck platform 110 for helping to stabilize the front wheel of the motorcycle 102. Wheel chocks are well known to one of ordinary skill in the art. The wheel chock 109 may be an added feature of the invention, however the core of the invention does not include the wheel chock.

DESCRIPTION OF PREFERRED EMBODIMENTS

Figure 3:
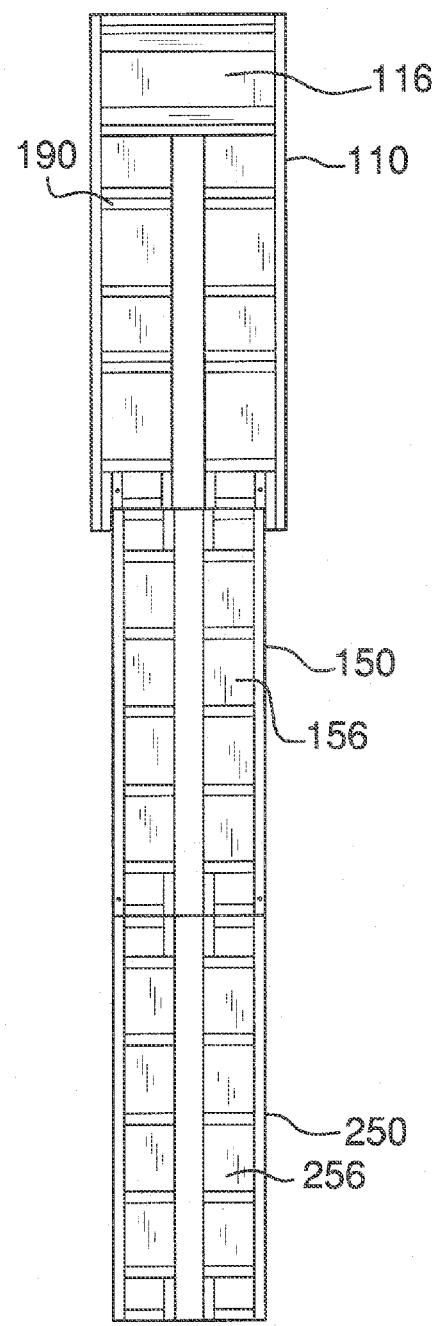
FIG. 3 is a bottom view of the system of the present invention.
Figure 4:
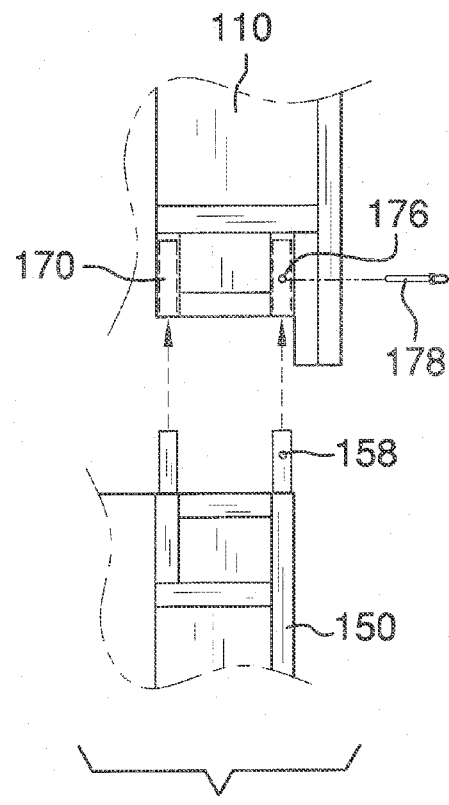
FIG. 4 is a detailed view of the system of the present invention.

Referring now to FIGS. 1-9, the present invention features a deck and ramp system 100 for semis/tractors. Semis/tractors are well known to one of ordinary skill in the art. For example, the dictionary may define a semi/tractor as a vehicle consisting of a tractor or cab with an engine.

Without wishing to limit the present invention to any theory or mechanism, it is believed that the system 100 of the present invention is advantageous because the system 100 features a unique design that allows it to be Department of Transportation (DOT) approved. The DOT has many guidelines, regulations, and requirements, and semis/tractors must abide by the guidelines, regulations, and requirements. As such, the system 100 of the present invention when installed on the semi/tractor does not violate the current guidelines, regulations, and requirements, and it is the unique design of the system 100 of the present invention that allows the system 100 to be DOT approved. For example, the means by which the system 100 is installed (e.g., bolts, e.g., eight 18-inch bolts, that hold the system down to the frame rails) does not violate DOT guidelines. The bolts and configuration of the bolts can be seen in FIG. 8A.

The deck and ramp system 100 of the present invention comprises a deck platform 110 having a first side 111, a second side 112 (opposite the first side 111), a third side 113, a fourth side 114, a top surface 115, and a bottom surface 116.

Figure 6:
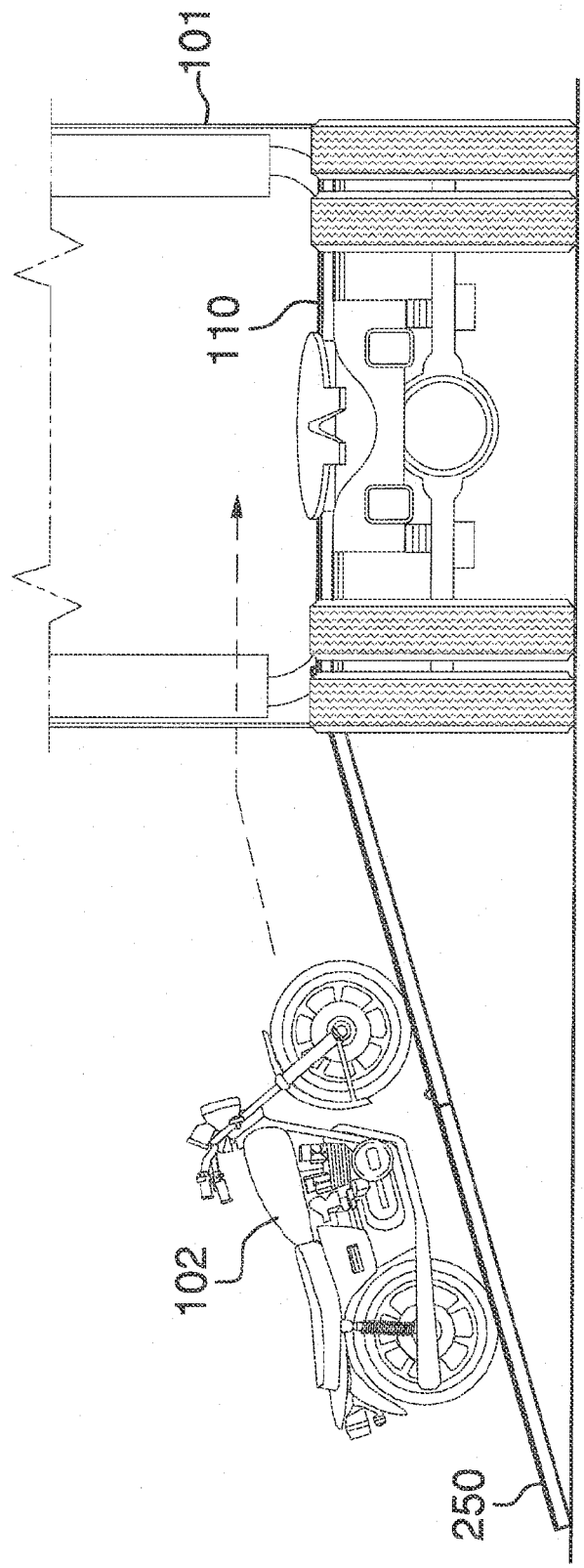
FIG. 6 is an in-use view of the system of the present invention.
Figure 7A:
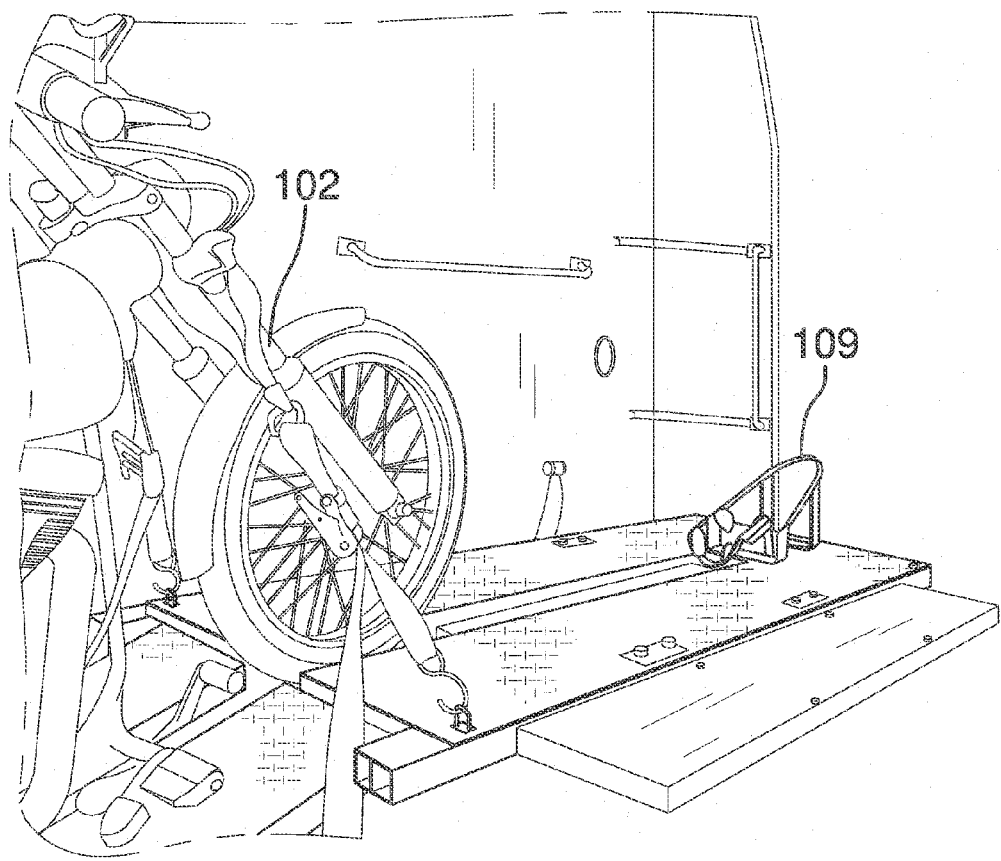
FIG. 7A is an in-use view of the system of the present invention.
Figure 7B:
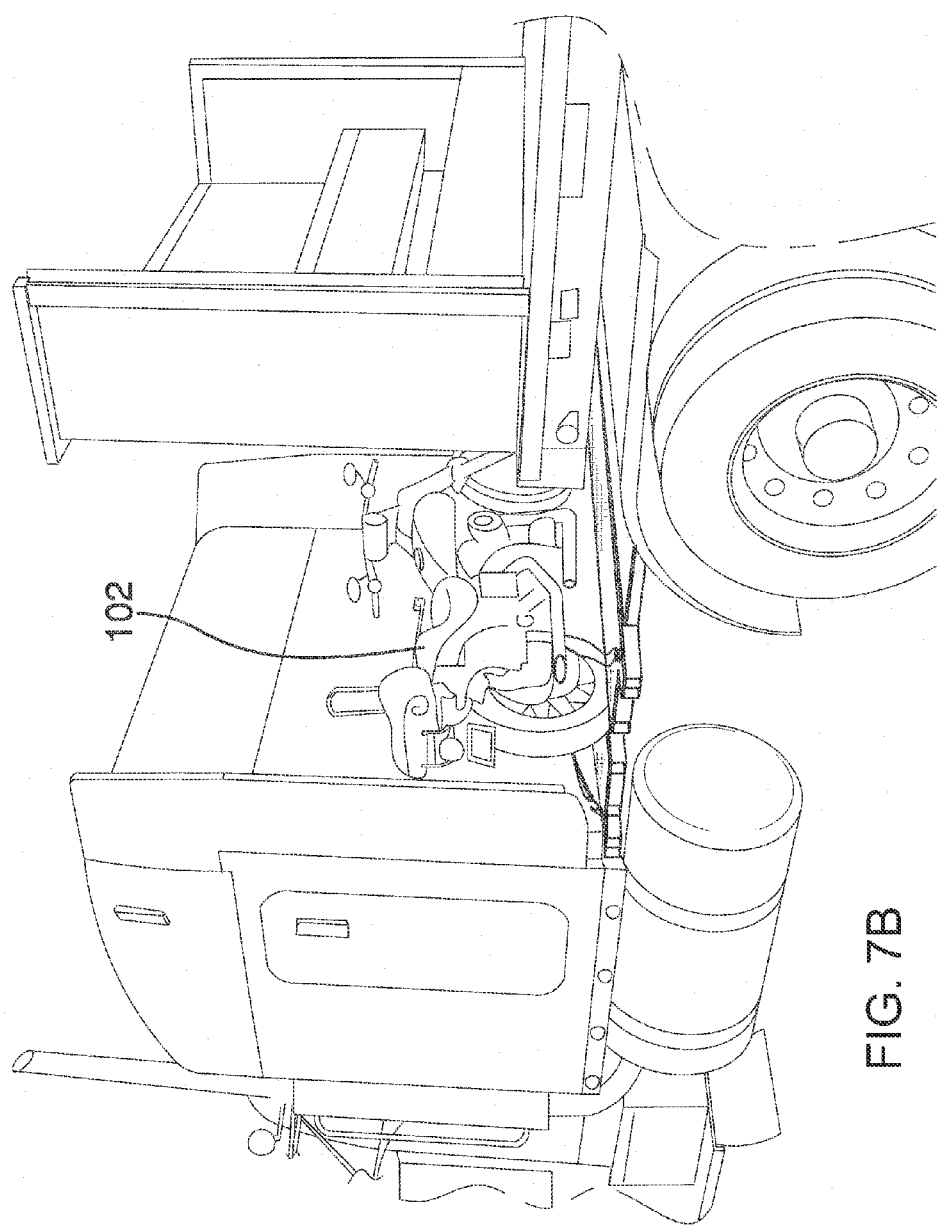
FIG. 7B is an in-use view of the system of the present invention; wherein the ramps are removed from the deck platform 110 (e.g., after the motorcycle 102 is loaded on the deck platform 110 and the semi/tractor is in use).

The deck platform 110 is installed (e.g., bolted) on the frame 101b (e.g., in lieu of the standard deck plate 101a) behind the cab or sleeper of the semi/tractor 101 as shown in FIG. 6. For reference, FIG. 9A and FIG. 9B show a semi prior to installation of the deck platform 110. Standard deck plates 101a (e.g., aluminum plates) are well known to one of ordinary skill in the art. The deck platform 110 is installed on the frame 101b of behind the cab or sleeper such that the first side 111 and the second side 112 of the deck platform 110 are perpendicular to the length of the truck. This configuration ensures that the deck platform 110 can be accessed from the passenger side or the driver side of the semi/tractor. The system 100 of the present invention utilizes bolts to hold down to the frame rails (e.g., eight 18 inch U-bolts). The installation is DOT approved (e.g., the deck is not bolted to the crossbar).

Disposed on the top surface 115 of the deck platform 110 is one or more securing means, for example a first securing means 120a, a second securing means 120b, a third securing means 120c, and a fourth securing means 120d. The securing means 120 may be arranged as shown in FIG. 1 wherein the securing means 120 are positioned in the corners of the deck platform 110 (e.g., the first securing means 120a positioned near the intersection of the first side 111 and the third side 113, the second securing means 120b positioned near the intersection of the second side 112 and the third side 113, the third securing means 120c positioned near the intersection of the second side 112 and the fourth side 114, the fourth securing means 120d positioned near the intersection of the first side 111 and the fourth side 114). In some embodiments, the securing means 120 are D-rings, however the securing means are not limited to D-rings. The securing means allow for bungees, straps, ropes, chains, and the like to be engaged to help secure a motorcycle 102 (or other means of transportation) to the deck platform 110.

Figure 8A:
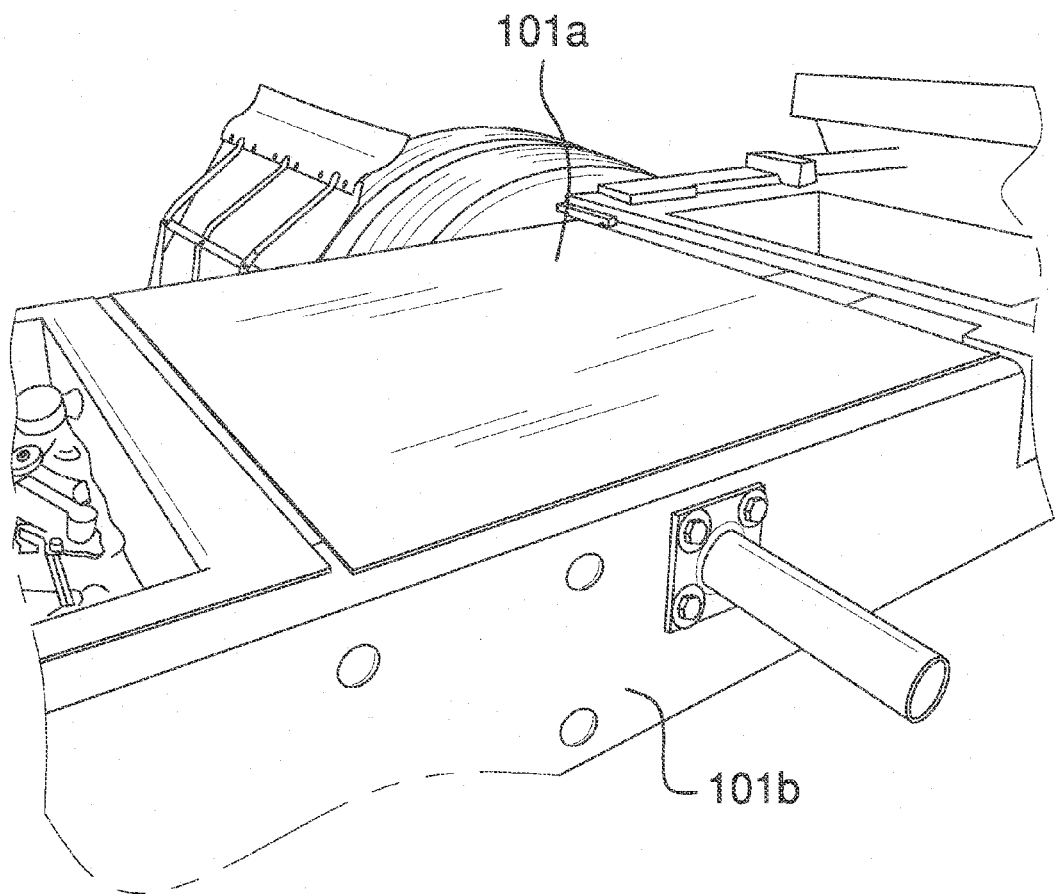
FIG. 8A is an example of the prior art showing a semi without the system of the present invention (e.g., showing where the system of the present invention can be installed behind the cab/sleeper).
Figure 8B:
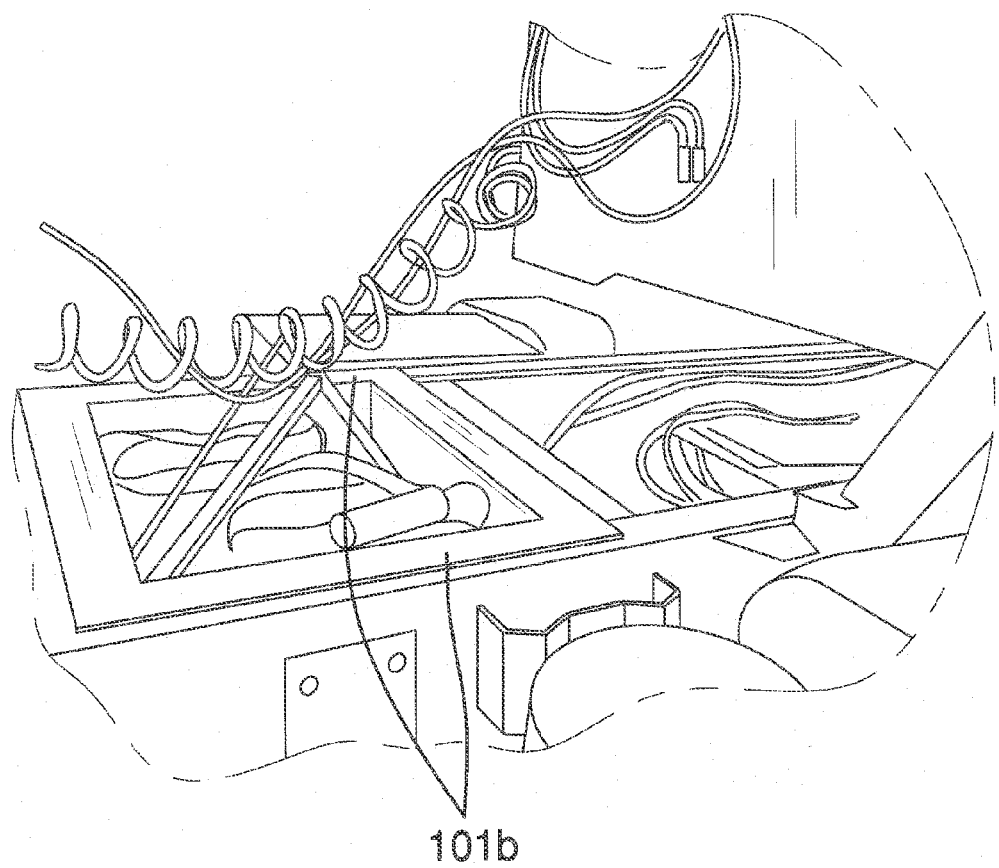
FIG. 8B is an example of the prior art showing a semi without the system of the present invention and with the standard deck plate 101a of the semi removed.

In some embodiments, a first channel 130 is disposed in the top surface 115 of the deck platform 110 extending from the fourth side 114 to near the third side 113. The first channel 130 is adapted to allow the wheel of a motorcycle 102 to pass and be engaged in the deck platform 110 (e.g., the wheel of the motorcycle 102 becomes sandwiched between the first side 111 and second side 112 of the deck platform 110). FIG. 8A shows the front wheel of the motorcycle engaged in the first channel 130.

As shown in FIG. 9A, a wheel chock 109 may optionally be installed on the deck platform 110 at or near the third side 113 of the deck platform 110. Wheel chocks are well known to one of ordinary skill in the art and are used to secure wheels (e.g., in the present invention a motorcycle wheel). The wheel chock 109 is not a part of the core system 100 of the present invention but may be installed on the system 100 of the present invention as an added feature.

The system 100 of the present invention further comprises a first ramp 150 and a second ramp 250. The first ramp 150 has a first side 151, a second side 152 (opposite the first side 151), a third side 153, a fourth side 154, a top surface 155, and a bottom surface 156. The second ramp 250 has a first side 251, a second side 252 (opposite the first side 251), a third side 253, a fourth side 254, a top surface 255, and a bottom surface 256. As shown in FIG. 1 and FIG. 2, the third side 153 of the first ramp 150 attaches (e.g., removably attaches) to the fourth side 114 of the deck platform 110 via a first attachment means, and the third side 253 of the second ramp 310 attaches (e.g., removably attaches) to the fourth side 154 of the first ramp 250 via a second attachment means.

The first ramp 150 attaches to the fourth side 114 of the deck platform 110 forming an angle 105 between the first ramp 150 and the deck platform 110. In some embodiments, the angle 105 is between about 110 to 130 degrees. In some embodiments, the angle 105 is between about 120 to 140 degrees. In some embodiments, the angle 105 is between about 130 to 150 degrees. In some embodiments, the angle 105 is between about 140 to 160 degrees. In some embodiments, the angle 105 is between about 150 to 170 degrees. The second ramp 250 is aligned with the first ramp 150 (e.g., see FIG. 5, FIG. 6). When the ramps 150, 250 are connected with the deck platform 110, a motorcycle 102 can be rolled up and secured to the deck platform 110.

Figure 5:
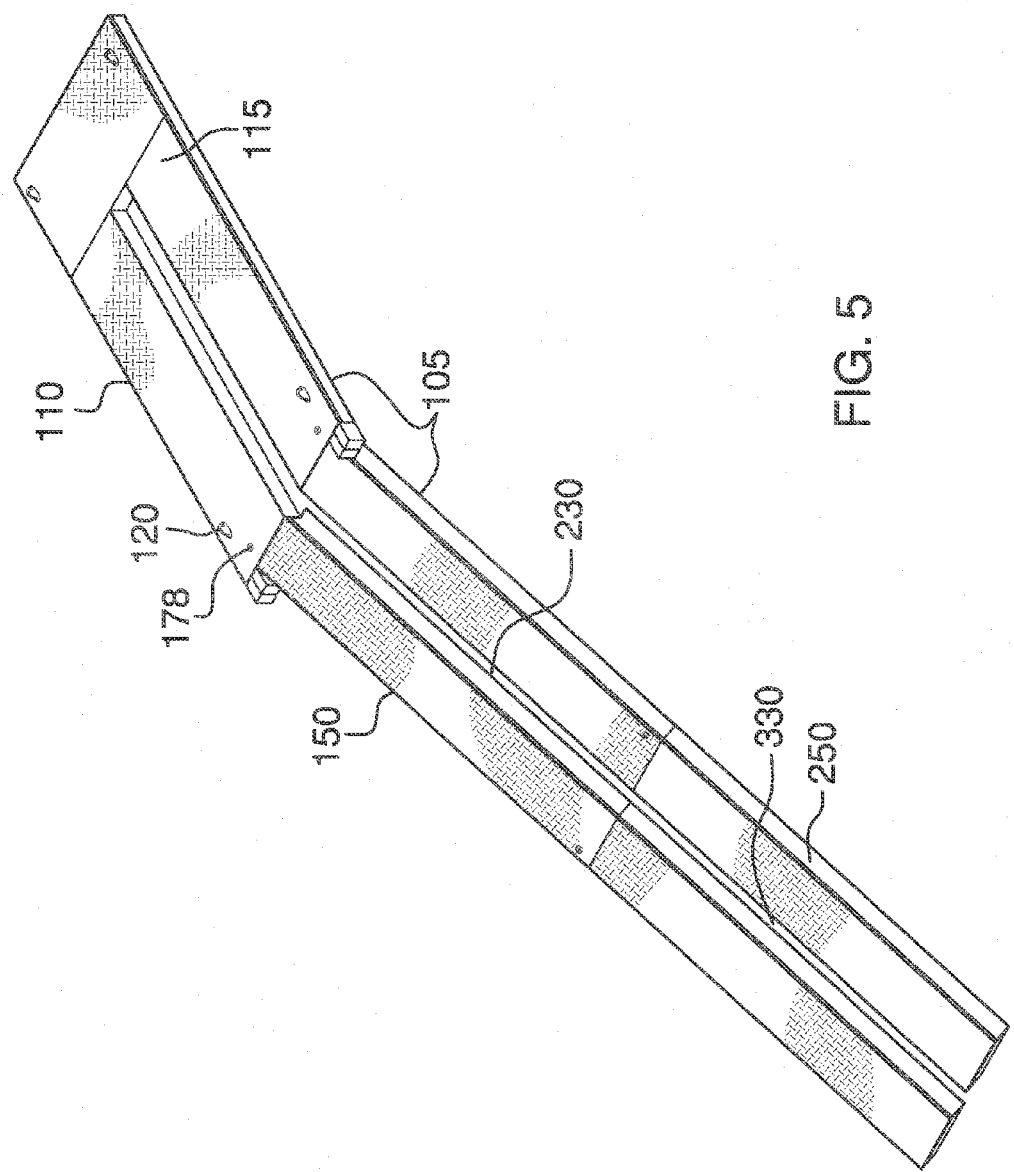
FIG. 5 is a perspective view of the system of the present invention.

As shown in FIG. 5, a second channel 230 is disposed in the top surface of the first ramp 150 extending from the third side 153 to the fourth side 154 and a third channel 330 is disposed in the top surface of the second ramp 250 extending from the third side 253 to the fourth side 254. The second channel 230 is aligned with the first channel 130 and the third channel 330 is aligned with the second channel 230. This allows the motorcycle 102 to be easily rolled up the ramps 150, 250 and onto the deck platform 110.

The first and second attachment means may comprise a locking pin mechanism. For example, in some embodiments, a flange 160 (or a pair of flanges) extends outwardly from the third side 153 of the first ramp 150 and is adapted to be snugly inserted into a channel 170 disposed in the fourth side 114 of the deck platform 110 (e.g., see FIG. 4). A first hole 176 is disposed in the deck platform 110 extending through to the channel 170. The hole 176 is adapted to accept a locking pin 178. A second hole 158 is disposed in the flange 160, wherein when the flange 160 is inserted into the channel 170 the second hole 158 aligns with the first hole 176. The second hole 158 is adapted to accept the locking pin 178. When the locking pin 178 engages the first and second holes, the locking pin 178 secures the deck platform 110 and the first ramp 150 together. This mechanism may also be employed to engage the second ramp 250 with the first ramp 150. The present invention is not limited to the aforementioned attachment means.

As shown in FIG. 3, in some embodiments, supports 190 (e.g., support slats) are disposed on the bottom surfaces 116, 156, 256 of the deck platform 110 and/or ramps 150, 250. In some embodiments, the supports 190 are the components that attach directly to the frame 101b of the semi 101. In some embodiments, the supports can help provide strength and stability to the deck platform 110 and ramps 150, 250.

FIGS. 7A-7D are detailed views of components of the system 100 of the present invention and describe examples of dimensions of said components. For example, in some embodiments, the first ramp 150 and second ramp 250 combined are about 12 feet in length (e.g., from the third side 153 of the first ramp 150 to the fourth side 254 of the second ramp 250). In some embodiments the channels 130, 230, 330 are about 2.5 inches in width. The present invention is not limited to these dimensions as any appropriate dimension may be used. As used herein, the term "about" refers to plus or minus ten percent of the referenced number. For example, an embodiment wherein the ramps 150, 250 combined are about 12 feet in length includes combined ramps between 10.8 and 11.2 feet in length.

Without wishing to limit the present invention to any theory or mechanism, it is believed that the system 100 of the present invention is advantageous because the system 100 features a deck that is bolted (or installed) to the frame behind the cab or sleeper of the semi/tractor, and the system 100 is designed for multiple types of semis/tractors. The motorcycle is accessible from the side of the semi/tractor (e.g., the driver's side or the passenger's side) as opposed to the back of the semi or tractor.

The disclosures of the following U.S. Patents are incorporated in their entirety by reference herein: U.S. Design Pat. No. D264199; U.S. Pat. No. 4,932,829; U.S. Pat. No. 5,730,577; U.S. Pat. No. 5,934,863; U.S. Pat. No. 6,634,849; U.S. Pat. No. 6,695,565; U.S. Pat. No. 6,827,543; U.S. Patent Application No. 2004/0101390.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A deck and ramp system 100 for allowing a motorcycle 102 to be mounted behind a cab or sleeper of a semi/tractor 101, said deck and ramp system 100 comprising:

(a) a semi/tractor 101 having a cab or sleeper and a frame 101b behind the cab or sleeper;

(b) a deck platform 110 having a first side 111, a second side 112 opposite the first side 111, a third side 113, a fourth side 114, and a top surface 115, wherein a first channel 130 is disposed in the top surface 115 of the deck platform 110 extending from the fourth side 114 to near the third side 113, the deck platform 110 is mounted to the frame 101b behind the cab or sleeper of the semi/tractor 101 such that the first side 111 and the second side 112 are perpendicular to a length of the semi/tractor 101;

(c) a first securing means 120a disposed on the top surface 115 of the deck platform 110 positioned near an intersection of the first side 111 and the third side 113, a second securing means 120b disposed on the top surface 115 of the deck platform 110 positioned near an intersection of the second side 112 and the third side 113, a third securing means 120c disposed on the top surface 115 of the deck platform 110 positioned near an intersection of the second side 112 and the fourth side 114, and a fourth securing means 120c disposed on the top surface 115 of the deck platform 110 positioned near an intersection of the first side 111 and the fourth side 114, the securing means 120 are adapted to engage bungees, straps, ropes, or chains so as to secure a motorcycle 102 to the deck platform with wheels of the motorcycle 102 engaged in the first channel 130;

(d) a first ramp 150 having a first side 151, a second side 152, a third side 153, a fourth side 154, a top surface 155, and a second channel 230 disposed in the top surface 155 extending from the third side 153 to the fourth side 154, the third side 153 of the first ramp 150 removably attaches to the fourth side 114 of the deck platform 110 such that the second channel 230 is aligned with the first channel 130, the first ramp 150 is at an angle 105 with respect to the deck platform 110; and (e) a second ramp 250 having a first side 251, a second side 252, a third side 253, a fourth side 254, a top surface 255, and a third channel 330 disposed in the top surface 255 extending from the third side 253 to the fourth side 254, the third side 253 of the second ramp 250 attaches to the fourth side 154 of the first ramp 150 such that the third channel 330 is aligned with the second channel 230, the top surface 255 of the second ramp 250 is aligned with the top surface 155 of the first ramp 150.

2. The system 100 of claim 1, wherein the securing means 120 comprise D-rings.

3. The system 100 of claim 1, wherein the angle 105 is between about 120 to 140 degrees.

4. The system 100 of claim 1, wherein the angle 105 is between about 130 to 150 degrees.

5. The system 100 of claim 1, wherein the angle 105 is between about 140 to 160 degrees.

6. The system 100 of claim 1, wherein a flange 160 extends outwardly from the third side 153 of the first ramp 150 and is adapted to be snugly inserted into a channel 170 disposed in the fourth side 114 of the deck platform 110, a first hole 176 is disposed in the deck platform 110 extending through to the channel 170 and a second hole 158 is disposed in the flange 160, wherein when the flange 160 is inserted into the channel 170 the second hole 158 aligns with the first hole 176, the first hole 176 and the second hole 158 are both adapted to accept a locking pin 178, the locking pin 178 secures the first ramp 150 to the deck platform 110.

7. The system 100 of claim 1, wherein a flange 160 extends outwardly from the third side 253 of the second ramp 250 and is adapted to be snugly inserted into a channel disposed in the fourth side 154 of the first ramp 150, a first hole is disposed in the first ramp 150 extending through to the channel and a second hole is disposed in the flange 160, wherein when the flange 160 is inserted into the channel the second hole aligns with the first hole, the first hole and the second hole are both adapted to accept a locking pin 178, the locking pin 178 secure the second ramp 250 to the first ramp 150.

* * * * *